United States Patent [19]
Briscoe et al.

[11] Patent Number: 5,063,695
[45] Date of Patent: * Nov. 12, 1991

[54] REPLACEABLE WEAR ELEMENT AND METHOD

[75] Inventors: Terry L. Briscoe, Portland; Paul C. Sprunger, Dundee, both of Oreg.

[73] Assignee: ESCO Corporation, Portland, Oreg.

[*] Notice: The portion of the term of this patent subsequent to Feb. 26, 2008 has been disclaimed.

[21] Appl. No.: 627,509

[22] Filed: Dec. 20, 1990

Related U.S. Application Data

[63] Continuation-in-part of Ser. No. 478,359, Feb. 12, 1990, Pat. No. 5,005,304, and a continuation-in-part of Ser. No. 528,087, May 24, 1990, Pat. No. 4,995,176.

[51] Int. Cl.⁵ ............................................. E02F 9/28
[52] U.S. Cl. .................................. 37/141 R; 37/115; 403/331; 403/381; 172/753; 172/772
[58] Field of Search ............... 403/353, 381, 331; 37/135, 141 R, 141 T, 115; 172/719, 753, 772, 772.5

[56] References Cited

U.S. PATENT DOCUMENTS

| | | | |
|---|---|---|---|
| Re. 33,454 | 11/1990 | Potter | 403/331 X |
| 3,202,226 | 8/1965 | Carson | 172/753 |
| 3,461,331 | 9/1969 | Wood | 172/719 |
| 3,521,386 | 7/1970 | Francklyn | 37/141 R |
| 4,457,380 | 7/1984 | Curry | 172/753 X |
| 4,716,666 | 1/1988 | Potter | 172/719 X |
| 4,995,176 | 2/1991 | Briscoe et al. | 172/753 X |
| 5,005,304 | 4/1991 | Briscoe et al. | 172/753 X |

FOREIGN PATENT DOCUMENTS

| | | | |
|---|---|---|---|
| 2529270 | 12/1983 | France | 403/381 |
| 275868 | 9/1970 | U.S.S.R. | 37/141 R |

*Primary Examiner*—Dennis L. Taylor
*Assistant Examiner*—Arlen L. Olsen
*Attorney, Agent, or Firm*—Tilton, Fallon, Lungmus & Chestnut

[57] ABSTRACT

An assembly of wear element for installation on the wearable part of a structure engageable with abrasive material including a relatively elongated base element adapted to be secured to the wearable part and a relatively elongated wear element releasably, reversibly mounted on the base element, each of the elements having longitudinally spaced apart dovetail surfaces in one outstanding wall portion and at least one surface in a second opposed outstanding wall portion positioned between the spaced art dovetail surfaces. A method of designing the dovetail connection through a repeating pattern is also disclosed.

10 Claims, 7 Drawing Sheets

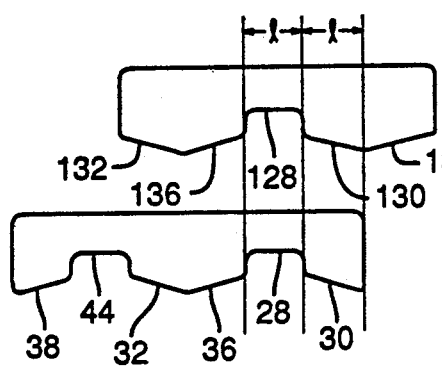
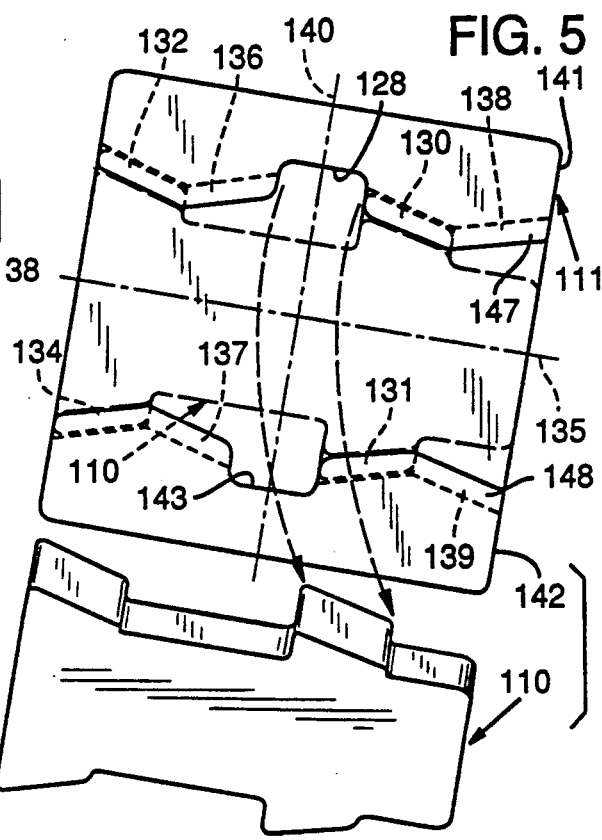
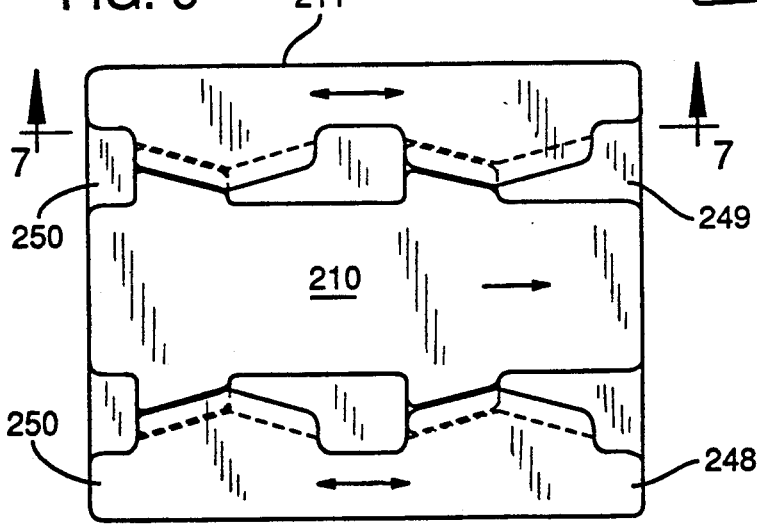
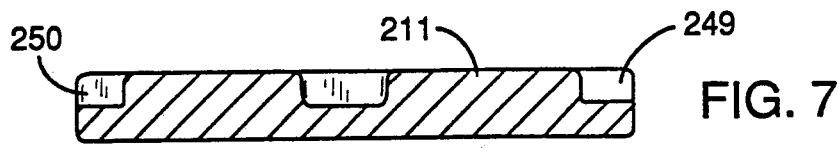

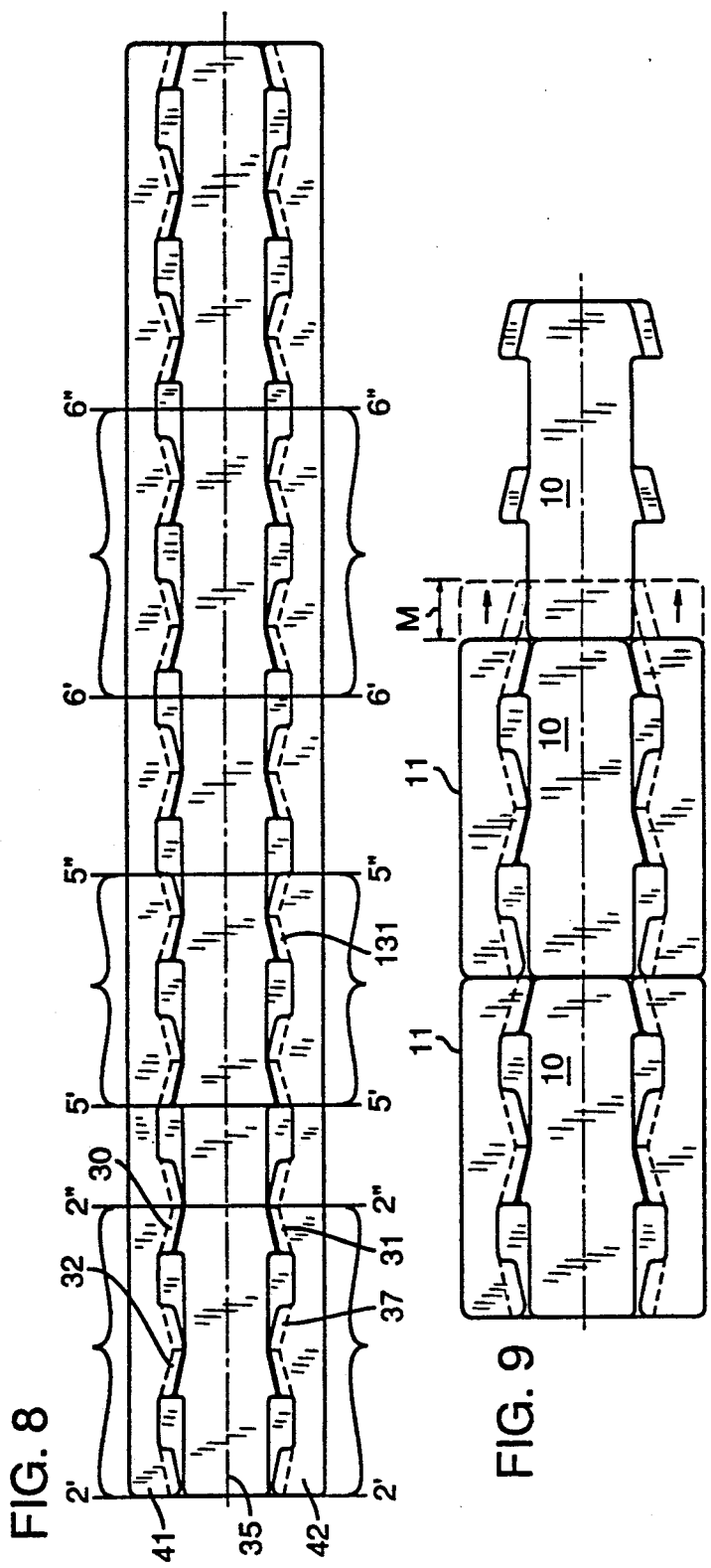

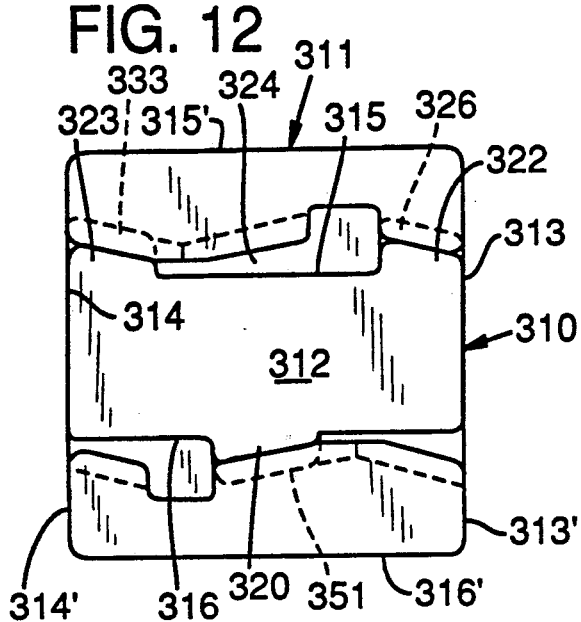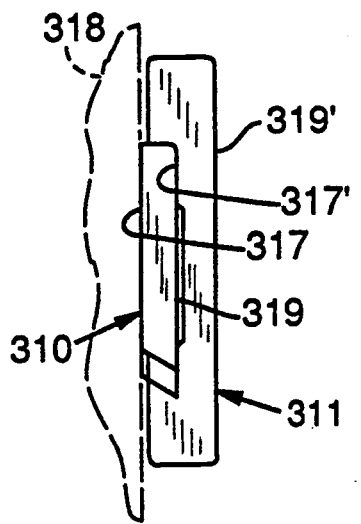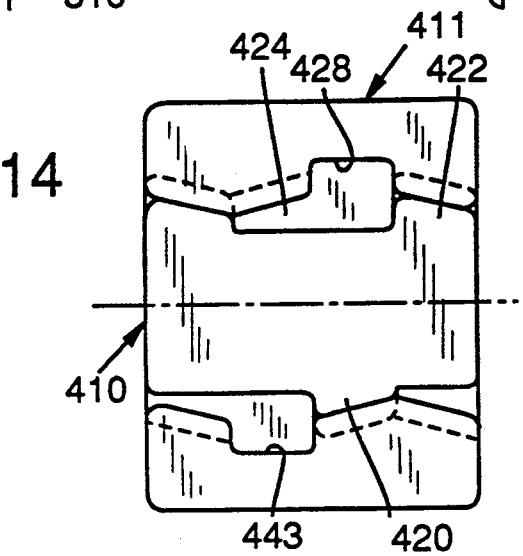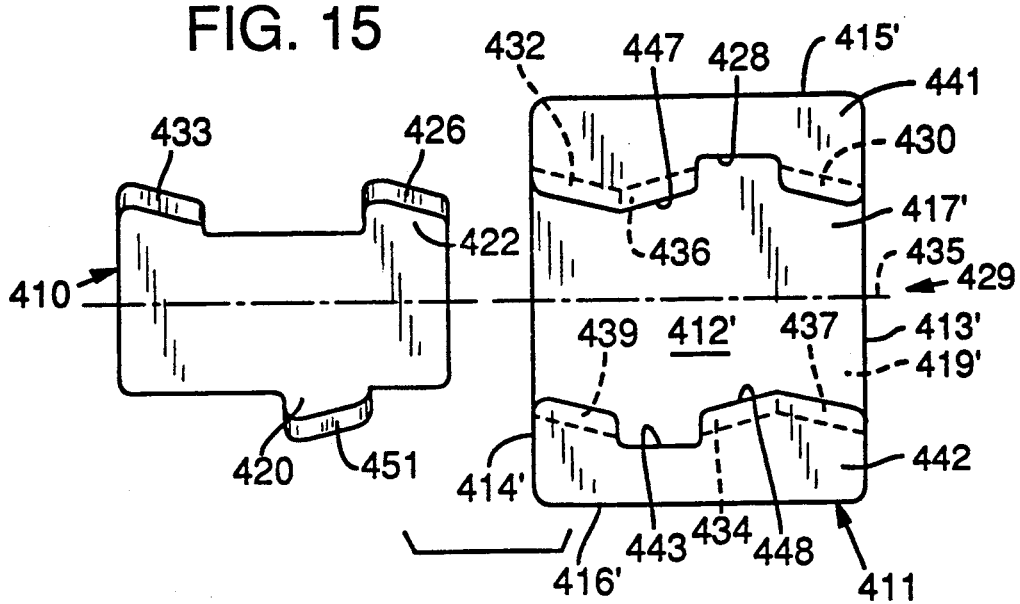

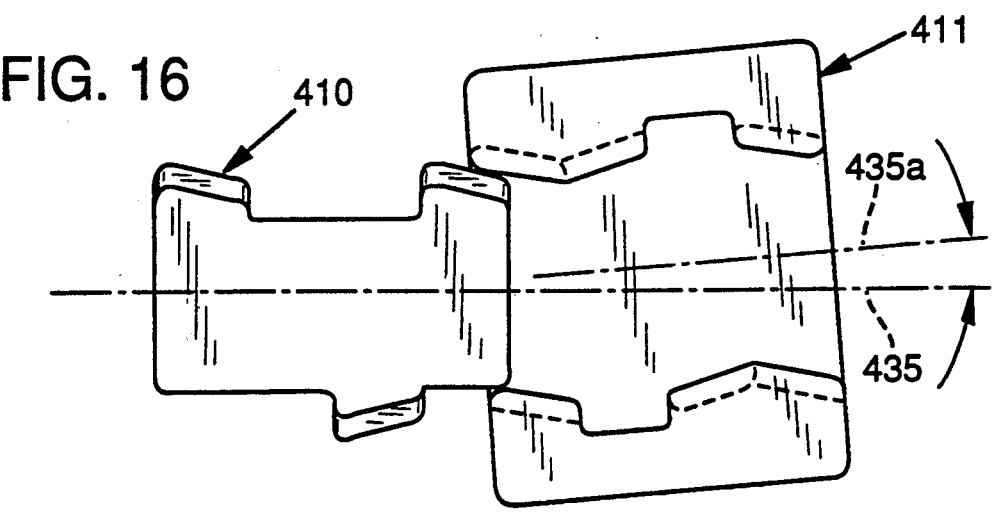
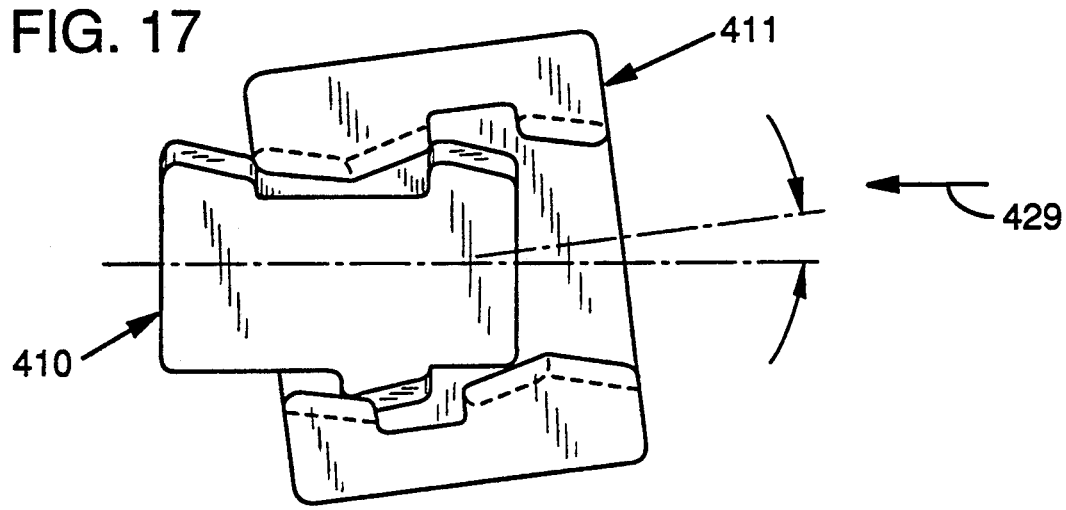
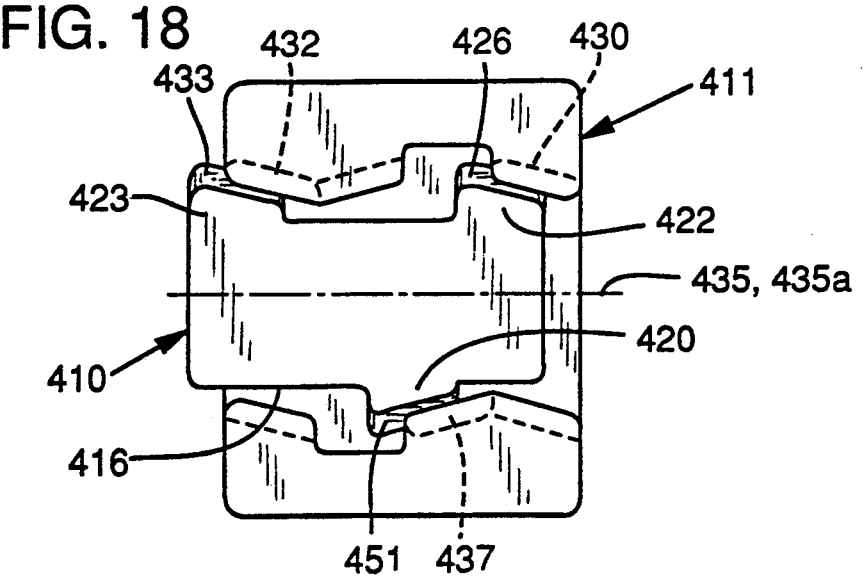

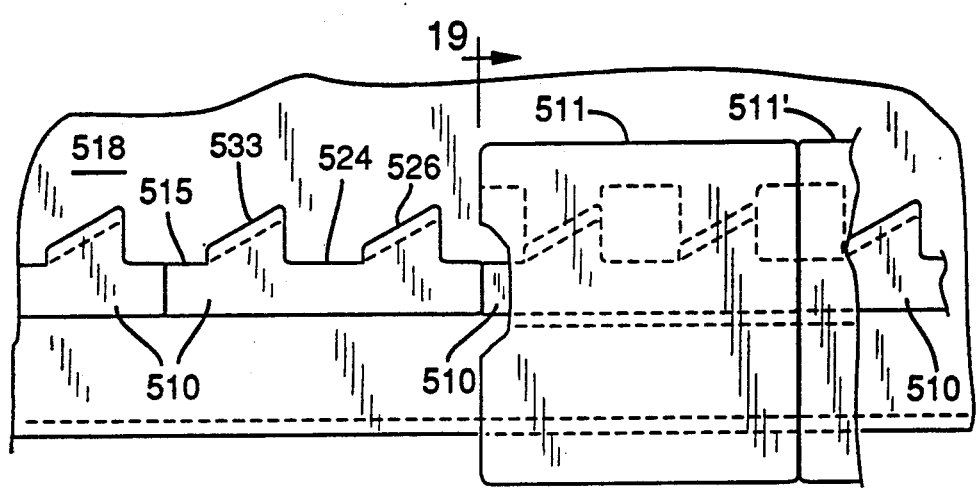
FIG. 20
FIG. 19
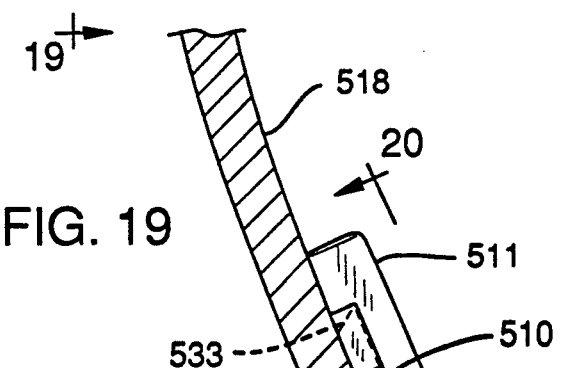
FIG. 21
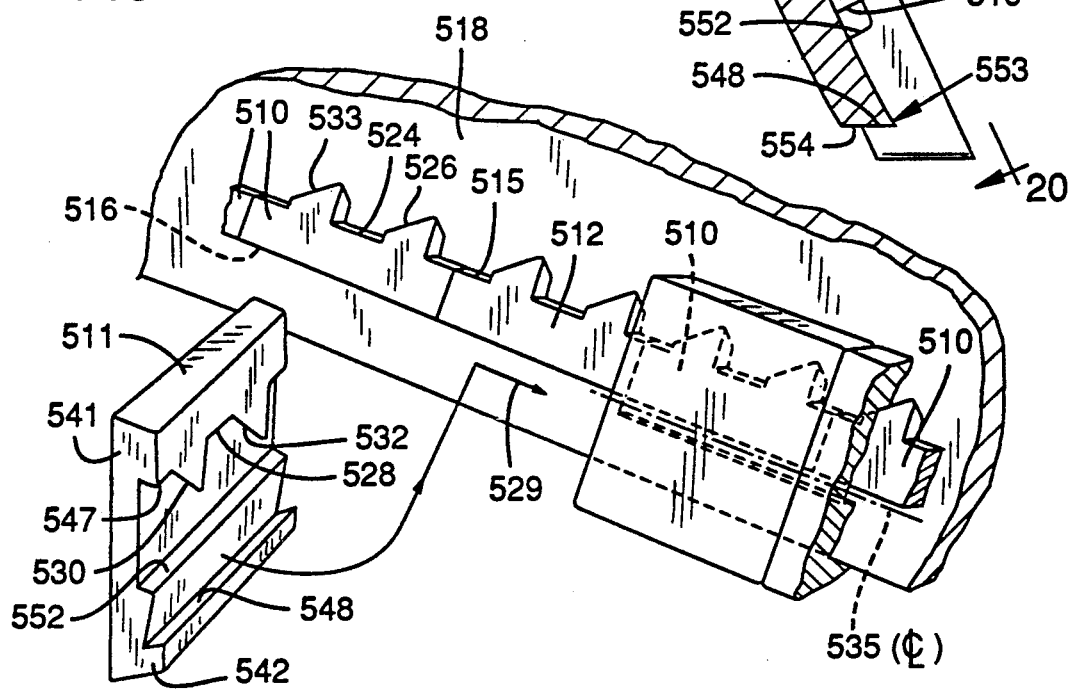

REPLACEABLE WEAR ELEMENT AND METHOD

This application is a continuation-in-part of our co-pending applications, Ser. No. 478,359 filed Feb. 12, 1990, now U.S. Pat. No. 5,005,304 and Ser. No. 528,087 filed May 24, 1990, now U.S. Pat. No. 4,995,176.

BACKGROUND AND SUMMARY OF INVENTION

This invention relates to a replaceable wear element and method and, more particularly, an element for installation on the wearable part of a structure engageable with abrasive material and a method of designing a dovetail connection therefor.

This invention is an improvement on co-owned U.S. Pat. No. RE 33,454. In that patent, a pair of spaced apart transversely-aligned, convergent dovetails were employed to provide a readily replaceable wear element—as for a cooperating base on the underside of an excavating bucket, scraper mold board, liner for an ore chute, or the like. The assembly of base and wear element was intended for installation in only one direction. This has not served the needs of operators in excavating, mining, etc. where reversibility is required.

It is also to be appreciated that the element subject to wear may have to be replaced frequently—many times the base element to which it is attached outlasting a multiple of wear elements.

According to the instant invention, reversibility is achieved through a novel arrangement of dovetail surfaces which makes possible the utilization, for example, of a single wear element where previously two different replacement elements had to be stored. For example, in the case of a bucket, it is advantageous to provide a wear element that wraps around a corner and thus, utilizing the patent teachings, it would be necessary to have both right and left hand styles. Now, through the practice of the invention, only a single, versatile replacement element is needed. This is a matter of some consequence to operators because buckets are usually employed in primitive conditions and storage facilities limited. Thus, anything that reduces the number of parts to be stored is highly desirable.

Further, the four dovetail surfaces required some care in manufacture to develop proper contact. Also, according to the instant invention, the novel arrangement of dovetail surfaces provides three-area contact. This results in stability, fit and installation advantages.

More particularly, the wear element has a pair of longitudinally aligned and longitudinally spaced apart dovetail surfaces and a transversely spaced third dovetail surface positioned between the spaced pair of dovetail surfaces. Also, one of the wear or base elements may have a second pair of longitudinally aligned and longitudinally spaced apart dovetail surfaces flanking the third surface and a single surface interposed between the pair of surfaces. This permits reversible mounting of the two pair-equipped element on the one pair-equipped element, both mountings being "three point" for advantageous ease, stability, etc.

Where "four point" contact is desired, each of the base and wear elements has first and second pairs of longitudinally spaced apart dovetail surfaces with one of the elements having third and fourth pairs of longitudinally spaced apart dovetail surfaces and with the dovetail surfaces of the third and fourth pairs being interlaced or intersperced with the dovetail surfaces of the first and second pairs. This permits reversible mounting of the four pair-equipped element on the two pair-equipped element.

The instant invention also teaches a method for designing the dovetail connection by developing a repeating pattern of dovetail surfaces in a pair of opposing walls and terminating the elements by transversely cutting by spaced transverse planes. Additional details of the invention can be seen in the ensuing specification.

BRIEF DESCRIPTION OF DRAWING

The invention is described in conjunction with the accompanying drawing, in which—

FIG. 5 is a perspective, exploded view of a modified form of the four point invention with the assembled base element shown in dashed line;

FIG. 5A is a schematic representation of the showings in FIGS. 2 and 5 interrelated to show corresponding dovetail segments;

FIGS. 6 is a top plan view of a modified form of the invention seen in FIG. 5; and FIG. 7 is a sectional view seen along the sight line 7—7 applied to FIG. 6;

FIG. 8 is a schematic top plan view of a series of wear assemblies to illustrate alternative four point constructions;

FIG. 9 is a schematic top plan view of the construction of FIG. 2, illustrating disassembly;

FIG. 9A is a schematic top plan view of the construction of FIG. 6, illustrating disassembly thereof;

FIG. 12 is a top plan view of another embodiment of FIG. 14 having longer recesses and longer flanges.

FIG. 13 is an end elevational view of the assembly of each of FIGS. 12 and 14;

FIG. 14 is a top plan view of a modified form of the three point invention;

FIG. 15 is an exploded top plan view of the three point inventive assembly;

FIG. 16-18 are exploded top plan views of the FIG. 14 assembly in the process of assembly;

FIG. 19 is a fragmentary side elevational view of a further modification of the three point invention useful as a cutting edge for a mold board;

FIG. 20 is a fragmentary front elevational view of the assembly of FIG. 19; and

FIG. 21 is a fragmentary exploded plan view of the elements of FIGS. 19 and 20 showing the mode of assembly.

DETAILED DESCRIPTION

Figure 1:
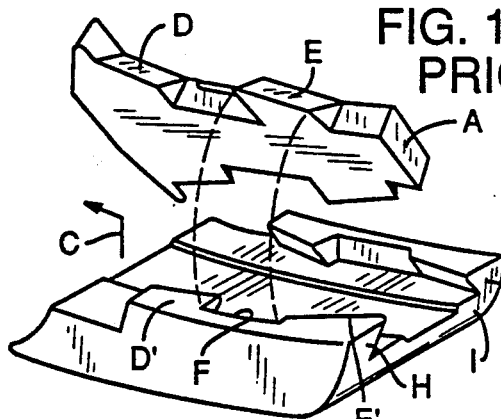
FIG. 1 is a perspective view of the prior art teaching of U.S. Pat. No. 4,716,666.

In the illustration given and with reference first to FIG. 1 which is entitled PRIOR ART, the symbol A designates the base element as seen in Patent RE 33,454 and the symbol B designates the wear element—in this case a runner for the underside of a dragline bucket. The arrow designated C shows the path through which the element B is moved in being installed on the base element A, i.e., it is first moved upwardly into general co-planar relation and thereafter slid rearwardly so as to engage the two pairs of mating dovetails, D and E on element A and D' and E' on element B. The two pairs of dovetail elements are separated by a notch F.

Figure 2:
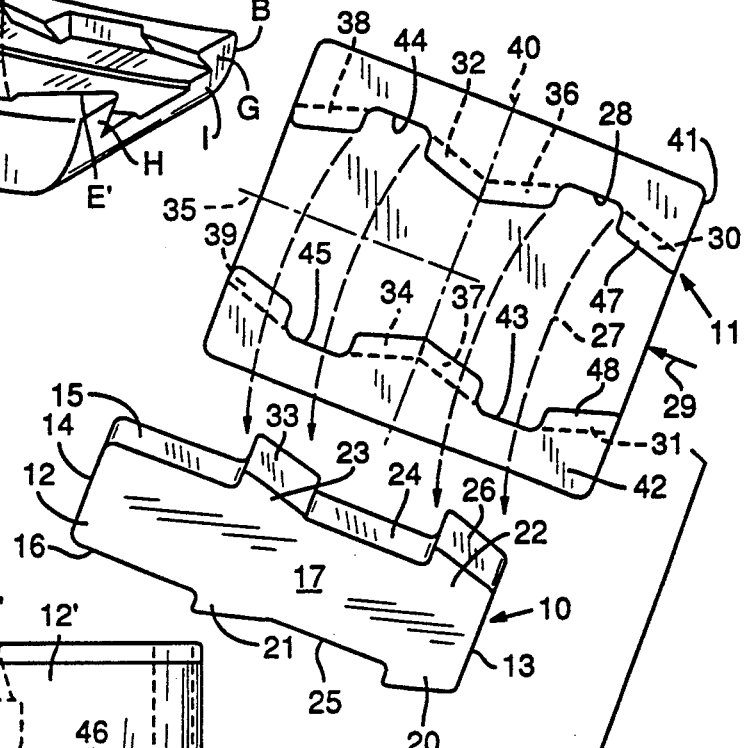
FIG. 2 is a perspective, exploded view of the elements of the four point embodiment of the instant invention.

Now referring to FIG. 2 which illustrates the assembly of the instant invention, the numeral 10 designates generally a base element while the numeral 11 designates generally the wear element. In the illustration given, the base element 10 includes a generally plate-like body 12 which is relatively elongated to provide end walls 13, 14 and sidewalls 15, 16. One body surface 17 is the inner surface which normally would be secured to the wearable part of a structure such as the corner portion 18 of a bucket (see FIG. 4) or other structure 318 (see FIG. 13). The outer surface opposite to the attached surface 17 can be seen only in FIG. 4 and is designated 19 and constitutes the surface in confronting relation to the wear element 11.

Figure 3:
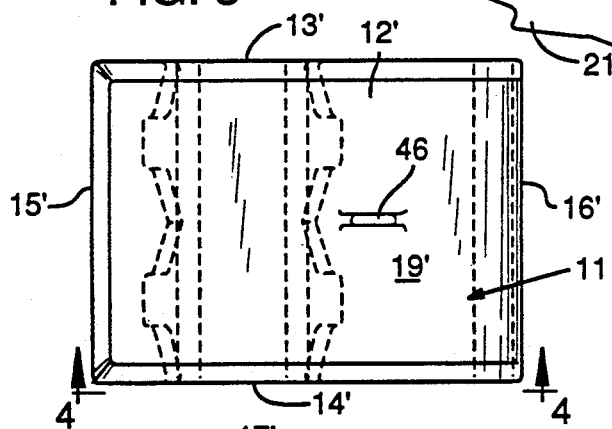
FIG. 3 is a top plan view of the assembly of FIG. 4.

The wear element 11 has corresponding body, walls and surface parts—designated by the same numerals, but with the addition of a prime ('). Thus, in FIG. 3, the body of the wear element 11 is 12', the end walls 13' and 14' and the sidewalls 15' and 16'. The inner surface 17' (see FIG. 4) is the surface confronting the base element 10 while the outer surface 19' is the one engageable with abrasive material.

Still referring to the base element 10 of FIG. 2, it will be noted that the body is equipped with integral transversely extending flanges as at 20, 21, 22 and 23 separated by relatively longitudinally elongated notches 24 and 25. The extremities of the flanges 20-23 are shaped to provide divergent/convergent dovetail surfaces. In other words, the surfaces are doubly sloped—both in the top to bottom direction of the normal dovetail and also sloped fore/aft to provide the divergence/convergence. The dovetail surfaces employed herein are like those in the previously mentioned co-owned U.S. Pat. No. RE 33,454 and express reference is hereby made to that patent for additional details of structure and operation.

Illustrative of the dovetail surfaces is the outer wall o surface 26 of the flange portion 22 in the base element 10 (see the central right hand portion of FIG. 2). When the wear element 11 is moved into engagement with the base element 10—as illustrated by the curved arrows 27 in FIG. 2—the flange 22 is received within the notch 28. Then, when the wear element 11 is moved in the direction of the arrow 29, the dovetail surface 26 engages a mating surface 30 in the wear element 11. Normally, the elements 10, 11 are positioned as seen in FIG. 2 when the normal flow of abrasive material is in the direction of the arrow 29—which tends to seat the dovetail surfaces 26, 30 more firmly against each other. More properly, such movement includes the seating engagement of the dovetail surface 31 (the mirror image of the dovetail surface 30) against the dovetail surface provided at the extremity of the flange 20; and in similar fashion, the dovetail surface 32 on the wear element 11 is seated on the dovetail surface 33 on the flange 23 of the base element 10 and, in like fashion, the dovetail surface 34 is seated against the dovetail at the extremity of the flange 21 on the base element 10.

We have found it advantageous to incline the surfaces 30, 31, 32 and 34 at an angle of about 15° relative to the longitudinal center line 35 of the wear element 11. It is to be understood that the mating dovetail surfaces as at 26, 33, etc. on the base element are similarly inclined to the longitudinal center line (not shown) of the base element 10. In some instances, we have found it to be further advantageous to alter somewhat the angle included between the centerline and dovetail surfaces to the range of about 10° to about 20° to insure better fits and easier release of the wear element.

Also assisting in developing better fits are the provision of rails 11a (see FIG. 4) on the surface of the wear element confronting the base element 10. These also can be seen in perspective in FIG. 1 adjacent the outstanding walls G and H and are designated by the symbol I.

The operation described thus far is very much like that achieved through the practice of the invention in U.S. Pat. No. RE 33,454. To obtain the advantageous reversibility of the instant invention, we provide additional dovetail surfaces as at 36, 37 just to the right of the transverse centerline 40 in FIG. 2 and as at 38 and 39 at the left of the wear element 11. It will also be noted that the dovetail surfaces are symmetrical about the transverse center line 40 as they also are about the longitudinal center line 35. Therefore, as the wear element 11 is rotated 180°, it would have the same appearance as that shown in FIG. 2 but with the dovetail surface 39 now being in the place of the dovetail surface 30, the dovetail surface 37 occupying the position of the dovetail surface 32, etc.

The dovetail surfaces in the wear element 11 are provided by outstanding wall portions as at 41 and 42 in a fashion similar to that provided at G and H in FIG. 1 relative to the prior art. More particularly, the surface remote from that being abraded is equipped with transversely-spaced, integral outstanding portions which provide confronting walls carrying the various dovetails. These confronting walls are mirror images and spaced equally away from the longitudinal center line 35. These confronting walls are equipped with two pairs of longitudinally spaced, substantially identical, transversely aligned notches intermediate the ends of the wear element 11. For example, one pair of notches is designated 28, 43 and the other pair 44, 45.

It will be seen that each notch is flanked at both longitudinal ends thereof by a dovetail surface segment of the opposed or confronting wall providing the same—with each of the segmental flanking surfaces being convergently related to its longitudinal center line in proceeding away from its associated notch. This is illustrated by considering the dovetail surfaces 30, 36 as the segments referred to in connection with the notch 28 and the center line 35. The same applies to the segments 32, 38 relative to the notch 44, the segments 34, 39 relative to the notch 45 and the segments 31, 37 relative to the notch 43.

Figure 4:
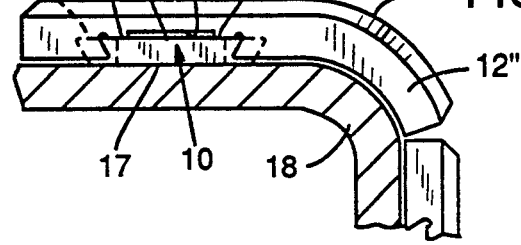
FIG. 4 is a fragmentary side elevational view of the inventive assembly as applied to the corner of a bucket as would be seen along the sight line 4—4 applied to FIG. 3.

The reversibility of the wear element 11 relative to the base element 10 not only is advantageous in the case of left and right mountings as in FIG. 4 where the body 12' is extended transversely of the length of the dovetail along one sidewall to go around a corner as at 12" but also in the case of wear elements in general. Where the wear elements are flat but subjected to abrasive forces in only one longitudinal direction, wear normally occurs more at the lead portion than the trailing portion. Therefore, switching the wear element end for end effectively extends the life thereof. In the case of the right and left hand elements of the character seen in FIGS. 3 and 4, the reversible feature is especially advantageous because these normally are quite extensive and ponderous, sometimes necessitating an integral eye as at 46 to lift the same into position on the associated bucket 18.

An alternative form of the invention can be seen in FIG. 5 which is advantageously employed where the length of the wear element is a restriction. This is achieved in the wear element 111 of FIG. 5 by the elimination of one pair of notches, utilizing only the notches 128 and 143. As before in the case of the illustration of FIG. 2, the illustration of FIG. 5 makes use of opposed or confronting walls 147 and 148 corresponding to walls 47, 48 of FIG. 2 which are again symmetrically related to the longitudinal center line 135. These are provided by upstanding integral portions as at 141 and 142. Further and again as in the instance of the showing in FIG. 2, the confronting walls 147, 148 are symmetrical about the transverse center line here designated 140.

Again, there are four pairs of dovetail surfaces but here the arrangement is somewhat different. The arrangement of the dovetail surfaces is the same in the respect that flanking the notch 128 are the surfaces 136 and 130 much the same as the surfaces 36 and 30 flank the notch 28 in FIG. 2. Also in proceeding to the left, a further dovetail surface or wall segment 132 extends to the left of the segment 136 just as the surface 32 extends to the left of the surface 36 in FIG. 2. However, the segment 38 of FIG. 2 has been relocated from the left hand end to the right hand end as at 138 in FIG. 5. More particularly, the opposed sidewalls 147 and 148 are arranged in two longitudinally spaced pairs of segments separated by a notch in each wall. Each wall of each pair includes two angularly related wall segments with the wall segment immediately adjacent the notch being convergently-related (in proceeding away from the notch) to its transversely aligned wall segment (130 versus 131) with the wall segment spaced from the notch being divergently related to its transversely aligned wall segment (138 versus 139).

Common to both constructions is the fact that each notch is flanked at both longitudinal ends by a segment of the confronting wall with each of the flanking segments being convergently related to the longitudinal center line in proceeding away from the associated notch. Further, each confronting wall remote from the notch has two additional segments for cooperation with the flanking segments in reversibly mounting the body on the base element 10, 110.

The notches and segments are constructed as having approximately the same length with the first of the additional segments being spaced approximately two lengths from a first of the flanking segments and the second of the additional segments being spaced approximately two lengths from the second of the flanking segments with the first flanking and additional segments being parallel and the second and additional segments being parallel.

The foregoing can be appreciated from a consideration of FIG. 5A which is a schematic top plan view of the showings in FIGS. 2 and 5 arranged to show corresponding elements, viz., the notches 28 and 128 being aligned as are the segments 30, 130, the segments 32, 132 and the additional segments 36, 136. The additional segments previously referred to include the segments 136 and 138 in the case of the schematic view of FIG. 5. The segment 132 cooperates with, i.e., is parallel to, the segment 130 and is spaced two lengths 1 therefrom. In the same fashion, the additional segment 138 is related to the flanking segment 136. Thus it will be seen relative to the showing in FIG. 5 that the additional segments are on opposite sides of the notch 128.

Still referring to FIG. 5A and in the case of the schematic representation of FIG. 2, the flanking segments are 36 and 30 with the additional segments being 38 and 32. It will be noted that the segment 38 is spaced two lengths from the segment 36 and is parallel thereto while the segment 32 is spaced two lengths from the segment 30 and again is parallel thereto.

It may be easier to understand the bi-directional dovetail constructions and features by noting that the variations are based on a repetitive pattern as seen in FIG. 8. For instance, one gets the base/runner combination of FIG. 2 if the FIG. 8 showing is cut along the section lines 2'—2' and 2"—2". One gets the base/runner combination of FIG. 5 if one cuts at 5'—5' and 5"—5". One gets the base/runner combination of FIG. 6 if one cuts at 6'—6'—6"—6". In all cases one gets a base/runner combination that is reversible. One can choose to cut where necessary to obtain specific objectives such as an assembly with dovetails shifted towards the front, towards the rear, or an assembly that is more compact when individual mounting is permissible (as opposed to serial mounting).

In the case of the embodiment of FIG. 2, it is possible to arrange the wear elements 11 in a continuous series—as in a wear runner for a dragline bucket, a lining for an ore chute, etc., with the end of one wear element abutting the other—and still provide the necessary sliding movement for removal when the same are removed serially. This is because the base 10 in FIG. 9 allows the wear element 11 to move the necessary distance M forward to disengage without blocking its movement with any necessary placement of dovetails of the base 10. However, to serially employ the embodiment of FIG. 5, end projections are added as at 249 and 250 on the wear element 211 of FIGS. 6 and 7 for movement relative to the base element 210. FIG. 9A shows this version with end projections and the movement M' needed to disengage dovetails and remove the wear element.

THREE POINT EMBODIMENT

Figure 10:
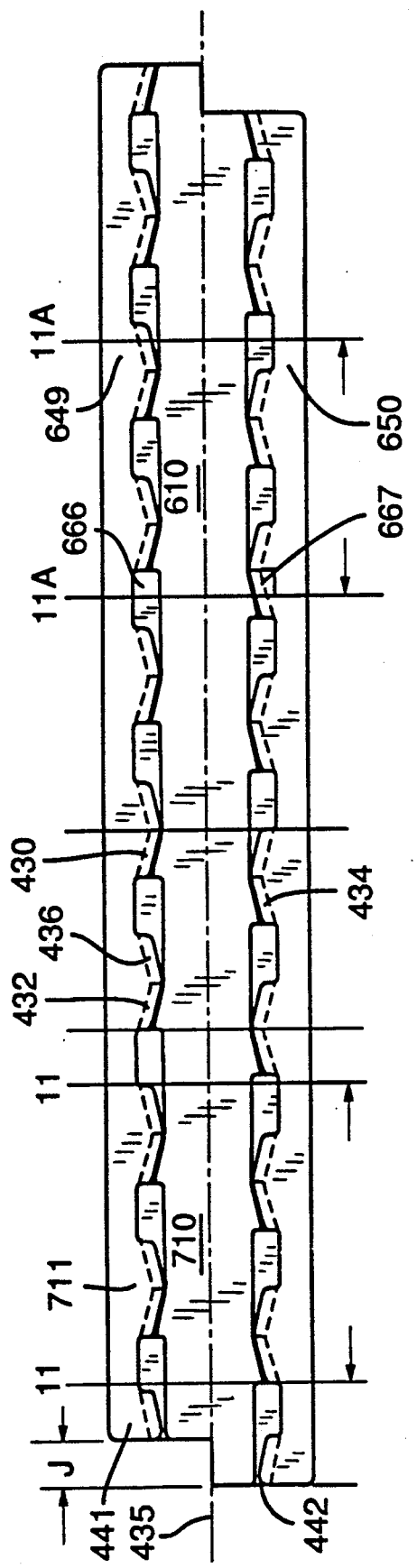
FIG. 10 is a view similar to FIG. 8 but with the upper and lower sides transposed approximately one-third period to illustrate the three-point construction and the method of the invention.

First, it should be appreciated that FIG. 8 on the four point embodiment shows a repeating pattern for the base and wear elements which can be cut in any of a various number of places and still be a useable base runner assembly. However, there are other ways to cut the continuous segment. FIG. 10 shows the first step—that of shifting one outstanding wall 442 longitudinally relative to the other wall 441. This develops an offset J not present in the four point embodiment.

Figure 11A:
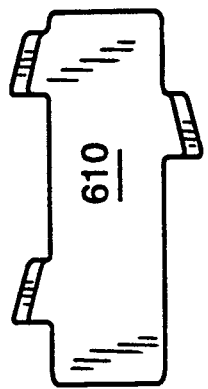
FIG. 11A is a top plan view of the base element as would be developed by cutting along the lines 11A, 11A of FIG. 10.
Figure 11:
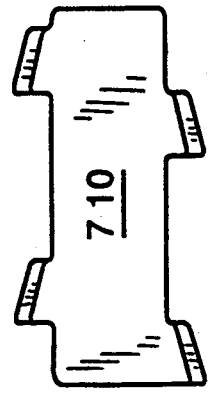
FIG. 11 is a top plan view of the base element as would be developed by cutting along the lines 11, 11 of FIG. 10.

FIGS. 10, 11 and 11A will be referred to later after the details of the three point embodiment have been described. Now referring to FIG. 12 which illustrates the three-point assembly of the instant invention, the numeral 310 designates generally a base element while the numeral 311 designates generally the wear element. In the illustration given, the base element 310 includes a generally plate-like body 312 which is relatively elongated to provide end walls 313, 314 and sidewalls 315, 316. One body surface 317 (see FIG. 13) is the surface which normally would be secured to the wearable part of a structure 18.

The surface opposite to the attached surface 317 can be seen only in FIG. 13 and is designated 319 and constitutes the surface in confronting relation to the wearable element 311. As in the case of FIG. 2, the body, wall and surface parts of the wear element are designated by the same numerals as those of the base element but with the addition of a prime ('), viz., 312'—317' and 319' or 412'—417' and 419'.

Still referring to the base element 310 of FIG. 12, it will be noted that the body sidewall 315 is equipped with integral transversely extending flanges as at 322 and 323 separated by a relatively longitudinally elongated recess 324. The extremities of the flanges 322, 323 are shaped to provide divergent/convergent dovetail surfaces.

Another flange 320 extends from the opposite body sidewall 316 and its extremity is also shaped to provide a divergent/convergent dovetail surface. Flange 320 is transversely aligned with the recess 324—so that flange 320 is intermediate the length of the body 312 while the flanges 322, 323 are adjacent the ends thereof. An important difference in the FIG. 12 showing from that of FIG. 2 is that there is only one flange extending transversely from the sidewall 316. In other words, there is no counterpart for the flange 21. Each of the flanges has an outer convergent/divergent dovetail surface.

Illustrative of the dovetail surfaces is the outer wall or surface 326 of the flange portion 322 in the base element 310 or 410 (see also the upper right portions of FIGS. 14 and 15). The showing in FIGS. 14 and 15 differs from that of FIG. 12 in that the recess 424 is much shorter than the recess 324, and the flange 420 is shorter than the flange 320.

The embodiment of FIGS. 14 and 15 permits both the same and a different type of mounting of the wear element 411 on the base element 410 from that illustrated in the prior art of FIG. 1. There, the notch F is aligned with the dovetail E, the wearable element B moved into engagement with the stationary base A and then moved rearwardly as indicated by the arrow C. The normal material flow is from right to left in the FIG. 1 illustration.

For mounting of the wear element 411 on the base element 410 notches 428 and 443 can be employed just as notches 28, 43 are employed in FIG. 1. The description of FIGS. 14, 15 applies also to FIG. 12 but certain reference numerals have been omitted in FIG. 12 for clarity. The notches 428, 443 are provided in the outstanding sidewall portions 441, 442, respectively—see FIG. 15. These correspond in general to the notch F in the outstanding wall portion G of the prior art of FIG. 1. By positioning the wearable element 411 so that the notch 428 is aligned with the flange 422 and the notch 443 is aligned with the rear end of the flange 420, the wear element 411 can be mounted on the base element 410. Thereafter the wearable element 411 is slid rearwardly (to the left in FIG. 15) along centerline 435 so as to bring the various dovetail surfaces into mating engagement. Again, we use the term rearwardly in the context of the direction of normal material flow—designated in FIG. 15 by the arrow 429. This results in increasing seating engagement between the dovetail surfaces on the wear element 411 and the base element 410. In this engagement the dovetail surface 430 mates with the dovetail surface 426 on the base element 410. Further, the dovetail surface 432 mates with the flange dovetail surface 433 and the dovetail surface 434 mates with the dovetail surface 451 on flange 420.

Also, the embodiment of FIGS. 14 and 15 can be employed to mount the wear element 411 on the base element 410 without utilizing notches as in the prior art as seen in the following alternative.

ALTERNATIVE MOUNTING

This alternative action of mounting the wear element 411 on the stationary base element 410 is illustrated in the sequence of views FIGS. 16-18. In FIG. 16, for example, it will be seen that the wear element 411 is oriented so as to have its longitudinal center line 435a at a minor acute angle to the center line 435 of the base element 410.

Then in FIG. 17, the wear element 411 is moved rearwardly onto the base element 410 in the direction of the arrow 429 and also the direction of normal material flow. Then the wear element 411 is rotated (clockwise as shown in FIG. 17) to bring the center lines 435a, 435 into alignment so that seating engagement of the various dovetail surfaces can be effected by further movement of the wear element 411 to the left as indicated in FIG. 18 along the center lines 435, 435a.

The dovetail surfaces on the base element 410 can be seen most clearly at the left hand end of FIG. 18. There, the numeral 433 designates the dovetail surface on the flange 423—the flange 423 being identical to the flange 323 of FIG. 12, and the flange 422 carrying the surface 426 is identical to the flange 322. Projecting from the opposite sidewall 416 is the flange 420 which, at its extremity, carries the dovetail surface 451.

Cooperating with these surfaces are confronting surfaces on the wear element 411. In the outstanding wall portion 441—see the right hand side of FIG. 15—the surface 430 engages the surface 426, the surface 432 engages the surface 433 and the surface 434 engages the surface 451. So the first wall 447 has a pair of longitudinally spaced apart dovetail surfaces 430, 432 which are inclined at a positive angle to the center line 435 (see FIG. 15). The second of the opposing walls, 448 has a single dovetail surface 434 which is inclined at a negative or reverse angle to the center line 435 and is positioned intermediate the adjacent ends of the pair of dovetail surfaces, 430, 432 on the first opposing wall 447.

In FIG. 12, by providing the longer recess 324 (versus the shorter recess 424 of FIG. 14) and the longer flange 320 (versus the flange 420) we are able to make the dovetail surface 351 approximately equal to the sum of the dovetail surfaces 326, 333. In contrast, the dovetail surface 451 in FIG. 15 is approximately the same longitudinal extent as each of the pair of surfaces 426, 433. The equalization of the single dovetail surface with the pair of dovetail surfaces (FIG. 12) makes possible somewhat greater holding power.

REVERSIBILITY

For the purpose of enabling the wear element 311, 411 to be mounted with either end positioned forwardly, the opposing walls 447, 448 are arranged to have the same contour when they are rotated 180°.

To achieve the dovetail surface engagement upon reverse positioning of the wear element 311, 411, three additional dovetail surfaces are provided. For example, the dovetail surface 436 (see FIG. 15) corresponds to the dovetail surface 434 and the pair of surfaces 439 and 437 correspond to the surfaces 430, 432.

It will be noted that the dovetail surfaces 430, 432 and the reverse-operation corresponding surfaces 437, 439 are adjacent the ends of the generally plate-like body 412' (see FIG. 15) constituting the wear element 411 (or, for that matter, the wear element 311). Also, irrespective of whether either end is positioned first, the pair of dovetail surfaces 430, 432 or 437, 439 has a dovetail surface positioned immediately forward of a notch 428, 443, as the case may be. Also, the notch 443 is immediately rearward of the dovetail surface 434 when one front wall is positioned forwardly and, when the element 411 is rotated 180°, the single dovetail surface 436 is immediately forward of the notch 428.

MOLD BOARD ATTACHMENT

The invention finds advantageous application to wear elements in earth working such as the mold board 518 of FIGS. 19-21. There, it is most desirable to provide a sharp bottom cutting edge and this is achieved by installing on moldboard 518 a plurality of wearable elements in side-by-side relation as at 511 in FIG. 20. Again, the wear element 511 has side and end walls and top and bottom surfaces—designations omitted for clarity.

For this purpose, the mold board 518 is equipped with a plurality of base elements 510 in horizontal side-by-side relation. Again, each base element 510 includes a generally plate-like body 512 (see FIG. 21) which is generally elongated to provide end walls, sidewalls, and top and bottom surfaces as in the previous embodiments of the invention. One base element sidewall 515 (positioned upwardly in FIG. 21) has generally the contour of the previously-described embodiments, viz., convergent/divergent dovetail surfaces 526 and 533 separated by a notch 524 (see FIGS. 20 and 21). However, the other sidewall surface 516 is not dovetailed but has a planar wall which merely confronts an interior shoulder 552 on the wear element 511. The other dovetail engagement of the wear element is achieved with the moldboard 518 as at 553—see the lower portion of FIG. 19.

The connection of the wear element 511 to the base element-equipped moldboard 518 can be best appreciated from a consideration of FIG. 21—particularly, the perspective view of the wear element 511 shown in the process of installation along the line 529 which is parallel to the longitudinal centerline 535.

First as seen in the lower left portion of FIG. 19, the moldboard has a beveled bottom edge as at 554 which is parallel to the ground and which may be equipped with bolted on cutting edges. This edge 554, effect, provides a dovetail surface which mates with the straight dovetail surface 548 provided on the wear element 511—see the lower right portion of the separated element in FIG. 21. In other words, the dovetail-providing surface 548 is not divergent/convergent as in the other embodiments of the invention. However, the wear element has outstanding wall portions as at 541 and 542. The wall portion 541 has a wall 547 which is equipped with the divergent/convergent surfaces 530, 532 separated by the notch 528—as in the previous embodiments. The walls 548, 554 extend parallel to the longitudinal centerline of the wear elements 511.

By longitudinal centerline, reference is again to the direction of movement of the wear element when it is installed. This is illustrated by the arrow segment designated 529 in FIG. 21. Depending upon the object of the designer, the longer dimension of the wear element may be either in the direction of movement for installation or transverse thereto.

For installation, the flange-like outstanding wall portion 542 at the bottom of the wear element 511 is hooked under the moldboard bottom wall 554 with the notch 528 aligned with the dovetail surface 533. The wearable element 511 is then pivoted to place the dovetail surface 533 in the notch 528 and thereafter the wear element 511 is slid to the right (as depicted in FIG. 21). When the wear elements 511 are assembled side-by-side, they serve to lock each other with the most outboard wear elements being locked in place by bolts or welds. Because of the dovetails being in only one of the upstanding walls, the dovetail angles do not have to be at the same convergence/divergence which relieves the need for exact tolerances.

In the practice of the invention, a variety of dovetail arrangements are possible while still following the basic teaching of the invention. Focusing on the wear element and, more particularly, the outstanding wall portions 41, 42 of FIG. 8 or 441, 442 of FIG. 10, this teaching includes the provision in one wall portion for a pair of spaced apart dovetail surfaces 30, 32 (FIG. 8) or 430, 432 (FIG. 10). These are advantageously arranged at a positive angle to the longitudinal centerlines 35, 435, respectively. On the other side of the longitudinal centerline, the second wall portion 42, 442 is equipped with a surface 37, 434, respectively, that confronts the dovetail surfaces in the first wall portion 41, 441. This surface 37, 434 is positioned intermediate the spaced apart surfaces 30, 32 or 430, 432.

As just pointed out with reference to the mold board attachment (FIGS. 19-21) this confronting surface may be a bevel or straight dovetail surface 548. When the confronting surface 434 is arranged at a negative angle with respect to the centerline 435 of FIG. 10, it provides the third surface of the three point embodiment (see FIG. 15 also).

By flanking the surface 434 with surfaces 437, 439 which are arranged at a positive angle relative to the centerline 435 and providing the counterpart negative angle surface 436 between the surfaces 430, 432, reversibility is achieved.

This three point repeating configuration can be adjusted to obtain stackability, viz., serial mounting as in FIGS. 9 and 9A. This is achieved by elongating the base element as at 610 in FIG. 10 and adding partial notches 649, 650, 666, 667. The resulting base element is seen in FIG. 11A and reflects the three-point construction.

Cutting the repeating pattern to develop the base element 710 (see the left hand portion of FIG. 10) permits the achievement of the four point embodiment. This wear element 711 is seen in FIG. 10 and corresponds generally to the showing of the wear element 211 of FIG. 6. However, the notches in opposing walls are not aligned, but offset. In FIG. 6, there is a zero offset while in FIG. 11 the offset is ⅓ a period. A period is the distance between any two similar or corresponding points, i.e., between the centers of two adjacent notches, the peaks of adjacent dovetails, etc. This can be appreciated from the symbol J applied to the left hand portion of FIG. 10 and this may extend up to ½ a period.

This offset J can be controlled depending upon situation and function desired. This repeating pattern can then be cut at an opportune place to provide a base/- wear element combination that is both stackable and reversible as well as providing three point, four point and multiple point contact.

We claim:

1. A replaceable wear element (11, 411, 511) for installation on the wearable part (18, 518) of a structure engageable with abrasive material comprising:

a unitary relatively elongated, generally rectangular plate-like body (12', 412') having end walls (13', 413', 14', 414'), sidewalls (15', 415', 16', 416') and top and bottom surfaces (17', 417', 19', 419'), one of said surfaces (19', 419') being adapted to engage said abrasive material, the other (17', 417') of said top and bottom surfaces being adapted to be positioned in confronting relation to said wearable part by movement generally along its longitudinal centerline (35, 435, 535), said other surface (17', 417') adjacent both sidewalls (15', 415', 16', 416') being equipped with transversely-spaced integral portions (41, 441, 42, 442, 541, 542) providing opposing walls (47, 447, 48, 448, 547, 548), a first (47, 447, 547) of said opposing walls having a pair of longitudinally spaced apart dovetail surfaces (30, 430, 530, 32, 432, 532) inclined at a positive angle to said centerline in the plane of said other surface (35, 435, 535), the second (48, 148, 548) of said opposing walls having a dovetail surface (37, 434, 548) positioned intermediate the adjacent ends of said first opposing wall pair of dovetail surfaces (30, 430, 530, 32, 432, 532).

2. The wear element of claim 1 in which said second opposing wall dovetail surface (37, 434) is inclined at an angle to said centerline (35, 435).

3. The wear element of claim 2 in which a pair of substantially identical notches (28, 43, 128, 143) are provided in said confronting walls (47, 48, 147, 148) intermediate the ends (13', 14') of said body (12'), each notch being flanked at both longitudinal ends thereof by said segmental dovetail surface (30, 36, 31, 37, 130, 137) of said confronting wall, each of said flanking surfaces being convergently related to said longitudinal centerline (35, 135) in proceeding away from its associated notch, each of said confronting walls having two additional segmental dovetail surfaces (32, 38, 34, 39, 132, 138, 134, 139) for cooperation with said flanking segments in reversibly mounting said body on said wearable part, a first (32, 34, 132, 134) of said additional segmental surfaces being spaced from a first (30, 31, 130, 131) of said segmental flanking surfaces and the second (38, 39, 138, 139) of said additional segmental surfaces being spaced from the second (36, 37, 136, 137) of said segmental flanking surfaces with said first flanking surfaces (30, 31) being parallel to said additional segmental surfaces (32, 34) and second flanking surfaces (36, 37) being parallel to said additional segmental surfaces (38, 39).

4. The wear element of claim 3 in which said body has a single engagement notch (128, 143) in each wall, said segmental additional surfaces being on opposite sides of said notch (128).

5. The wear element of claim 3 in which said body has a second engagement notch (44, 45) in each wall, said additional segmental surfaces (32, 38) both being on the same side of the first-mentioned notch (28).

6. The wear element of claim 1 in combination with a base element (10, 110, 410, 510), said base element being securable to said wearable part (18, 518) of a structure engageable with abrasive material, said base element having dovetail surfaces (26, 33, 426, 433, 526, 533) engaging said pair of longitudinally spaced apart dovetail surfaces (30, 32, 430, 432, 530, 532) in said first opposing wall.

7. The wear element of claim 1 in which said second opposing wall is a single dovetail surface (548) extending parallel to said centerline (535).

8. The wear element of claim 1 in which said body has a forward end (413') positioned first in the path of material flow, a notch (428) provided in said first wall (447) adjacent the rear end of the forward one (430) of said pair of dovetail surfaces, and a notch (443) in a second wall (448) adjacent the rear of a single dovetail surface (434).

9. The wear element of claim 1 in which said first opposing wall (447) is equipped with a single dovetail surface (436) positioned between said pair of longitudinally spaced apart dovetail surfaces (430, 432) and inclined at the same angle as a second wall single dovetail surface (434), a second opposing wall (448) being equipped with a pair of dovetail surfaces flanking said second wall single dovetail surface (434) and inclined at the same angle as said first wall pair (430, 432) of longitudinally spaced apart dovetail surfaces, said first wall (447) corresponding to said second wall (448) when rotated 180° whereby said wear element is reversely mountable on a mating base element.

10. A replaceable wear element for installation on the wearable part of a structure engageable with abrasive material comprising a unitary relatively elongated, generally rectangular plate-like body having end and sidewalls and top and bottom surfaces, one of said surfaces being adapted to engage said abrasive material, the other of said top and bottom surfaces being adapted to be positioned in confronting relation to said wearable part by movement along its longitudinal centerline, said other surface adjacent both sidewalls being equipped with transversely-spaced, integral outstanding portions providing confronting walls, said confronting walls being mirror images and spaced equally away from said longitudinal centerline, a pair of substantially identical, transversely aligned notches in said confronting walls intermediate the ends of said body, each notch being flanked at both longitudinal ends thereof by a segment of said confronting wall, each of said flanking segments being convergently related to said longitudinal centerline in proceeding away from its associated notch, each confronting wall remote from said notch having two longitudinally spaced apart additional segments for cooperation with said flanking segments in reversibly mounting said body on said wearable part, a first of said additional segments being spaced from a first of said flanking segments and the second of said additional segments being spaced from the second of said flanking segments with said first flanking and additional segments being parallel and second flanking an additional segments being parallel, and each of said confronting wall segments being sloped transversely toward said one surface and its adjacent side wall.

* * * * *